(12) United States Patent
Sato et al.

(10) Patent No.: US 6,262,507 B1
(45) Date of Patent: Jul. 17, 2001

(54) PERMANENT MAGNET MOTOR AND ROTOR THEREOF

(75) Inventors: Koji Sato; Takehisa Minowa; Koji Miyata, all of Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/396,420

(22) Filed: Sep. 15, 1999

(30) Foreign Application Priority Data

Sep. 30, 1998 (JP) .................................................. 10-277603
Sep. 30, 1998 (JP) .................................................. 10-277635
Sep. 30, 1998 (JP) .................................................. 10-278421

(51) Int. Cl.$^7$ .................................................. H02K 21/00
(52) U.S. Cl. .......................... 310/152; 310/156; 310/154; 29/596
(58) Field of Search .................................. 310/156, 254, 310/49 R, 181, 269, 152, 154; 29/596, 598

(56) References Cited

U.S. PATENT DOCUMENTS

| | | | |
|---|---|---|---|
| 4,012,652 | 3/1977 | Gilbert | 310/162 |
| 4,672,253 | * 6/1987 | Tajima et al. | 310/269 |
| 4,701,656 | 10/1987 | Fawzy | 310/254 |
| 4,739,203 | * 4/1988 | Miyao et al. | 310/67 R |
| 4,745,312 | * 5/1988 | Nagasaka | 310/49 R |
| 4,933,584 | * 6/1990 | Harms et al. | 310/162 |
| 5,289,064 | * 2/1994 | Sakamoto | 310/49 R |
| 5,323,077 | 6/1994 | Brandes | 310/156 |
| 5,604,390 | 2/1997 | Ackermann | 310/156 |
| 5,757,100 | * 5/1998 | Burgbacher | 310/186 |

\* cited by examiner

*Primary Examiner*—Nestor Ramirez
*Assistant Examiner*—Joseph Waks
(74) *Attorney, Agent, or Firm*—Wenderoth, Lind & Ponack, L.L.P.

(57) ABSTRACT

Disclosed is a permanent magnet motor consisting of a rotor which is a multi polar-magnetized cylindrical permanent magnet such as a neodymium/iron/boron magnet, and a stator having a plurality of stator teeth. Different from conventional but expensive multi-radial orientation of the magnetic anisotropy, the cylindrical permanent magnet has a direction of orientation along a single diameter of the cylinder that is perpendicular to the cylinder axis when a definite relationship is held between the number of the multipolar magnetic poles and the number of the stator teeth. Even when using such a simple and inexpensive cylindrical permanent magnet as the rotor, high performance of the permanent magnet motor can be ensured with regard to a large induced voltage and small torque ripples. When such a rotor having an increased height is desired, two or more of the cylindrical unit permanent magnets each having a single diametrical orientation are coaxially stacked one on the other into a block in such a relative disposition that the directions of two adjacent cylindrical unit permanent magnets make a rotational displacement angle of 180° divided by the number of the unit magnets.

6 Claims, 8 Drawing Sheets

PERMANENT MAGNET MOTOR AND ROTOR THEREOF

BACKGROUND OF THE INVENTION

The present invention relates to a multipolar-magnetized cylindrical permanent magnet to be used as a rotor of a permanent magnet motor or a synchronous motor, such as servomotors and spindle motors, and further relates to a permanent magnet motor including the rotor. More particularly, the invention relates to a multipolar-magnetized cylindrical permanent magnet having magnetic anisotropy in a single diametrical direction, or in a single direction perpendicular to the axis of the cylindrical magnet, as well as to a permanent magnet motor including the magnet as the rotor.

As is well known, permanent magnets having magnetic anisotropy, i.e. permanent magnets capable of being more easily magnetized in a specific direction than in other directions, are widely employed as a part of loudspeakers, electric motors, metering instruments and other electric apparatuses. Such an anisotropic permanent magnet is prepared from a permanent magnet material having crystalline magnetic anisotropy, such as certain hard ferrites and rare earth element-containing alloys. The material is pulverized into a powder of fine particles, followed by compression molding of the powder within a magnetic field (referred to as "in-field molding" hereinafter) to provide a powder compact which is followed by sintering of the powder compact. In the in-field molding of the magnetic powder, the magnetic particles are each oriented relative to the easy magnetization axis of the magnet crystallites as a consequence of the magnetic field applied, so that the resultant sintered magnet also has magnetic anisotropy in the direction of the magnetic field applied to the powder under compression during the in-field molding.

The direction of the magnetic field in the in-field molding of the magnetically anisotropic magnetic particles can be either perpendicular or parallel to the direction of compression for the molding. For example, the anisotropic direction, i.e. the most easily magnetizable direction, of a cylindrical permanent magnet prepared from a powder of a rare earth-based magnetic alloy can be either in parallel to the axial direction of the cylindrical form or in a radial direction perpendicular to the axial direction. Cylindrical rare earth permanent magnets having a radial anisotropic direction are employed as rotors in various types of permanent magnet motors such as AC servomotors, DC brushless motors and the like because of the advantages in that they can be freely magnetized in the axial direction, and no reinforcement is required for assembling unit magnets, as is required in the assemblage of segment magnets. In recent years, a radially anisotropic cylindrical permanent magnet having an increased height or dimension in its axial direction has been desired to meet the needs associated with the expansion of the application fields of permanent magnet motors.

A cylindrical permanent magnet having radial anisotropy is prepared usually by the method of in-field molding, or by the method of backward extrusion molding of the magnet powder. In the in-field molding method, while the magnetic alloy powder in a metal mold is compressed in the axial direction of the cylinder, a magnetic field is applied to the powder under compression in a radial direction through cores at each of the opposite ends of the cylinder. Accordingly, the height, i.e. the dimension in the axial direction of the cylinder, of a radially anisotropic cylindrical magnet is limited by the dimensions or shape of the cores, so that a radially anisotropic cylindrical magnet of an increased height can be prepared only with great difficulties. This method is also not productive because only one molded body can be obtained in a single molding operation using a single molding press. The method of backward extrusion molding is also disadvantageous due to the high cost for the preparation of molded bodies, in that the method requires a large and complicated, and hence very expensive, molding machine. Also, the yield of acceptable molded bodies is relatively low. This situation naturally increases the cost of permanent magnet motors using an expensive multi-radially anisotropic cylindrical permanent magnet as the rotor.

Even without using a multi-radially anisotropic cylindrical permanent magnet, a high-performance cylindrical magnet to be used as a rotor in a permanent magnet motor could be obtained when multipolar magnetization of a cylindrical permanent magnet is accomplished with a sufficiently high magnetic flux density on its surface, and with little variation of the magnetic flux densities among the magnetic poles. In this regard, a method is proposed in the papers of Electricity Society, Magnetics Group MAG-85-120 (1985), according to which a cylindrical magnet having magnetic orientation in a single direction perpendicular to the cylinder axis is prepared by using an in-field molding press under application of a magnetic field in the direction perpendicular to the direction of compression (referred to as a diametrically oriented cylindrical permanent magnet hereinafter). The magnet is provided with multipolar magnetization so that a multipolar cylindrical permanent magnet to serve as a rotor in a permanent magnet motor can be obtained without using an expensive multiradially anisotropic magnet.

The above mentioned cylindrical permanent magnet, which is magnetically oriented in a single direction perpendicular to the cylinder axis (referred to as a diametrically oriented cylindrical magnet), may have an increased height of 50 mm or even larger, if permitted by the dimensions of the cavity of the metal mold, and if a multi-stage molding method can be undertaken. Thus, a plurality of diametrically oriented cylindrical magnets can be obtained by a single operation of compression molding using a multi-cavity metal mold at low costs. Such a diametrically oriented multipolar cylindrical permanent magnet can be employed in place of expensive multi-radially anisotropic magnets as a rotor in permanent magnet motors.

Though possible in principle, the above mentioned diametrically oriented cylindrical permanent magnets are practically infeasible as rotors of permanent magnet motors due to the irregular distribution of magnetic flux density around the circumferential surface of the cylindrical permanent magnet. That is, the magnetic flux density is high on the magnetic pole at or in the vicinity of the direction of the diametrical orientation axis, and is low on the magnetic pole at or in the vicinity of the direction perpendicular to the diametrical orientation axis. This results in the rotational torque of the motor constructed with the rotor being necessarily uneven around the rotation axis, corresponding to uneven or irregular distribution of the magnetic flux density.

SUMMARY OF THE INVENTION

The present invention accordingly has a primary object to provide a permanent magnet motor using a diametrically oriented cylindrical permanent magnet as the rotor, without the above described problems and disadvantages, in the conventional permanent magnet motors of similar types. The unexpected discovery leading to the present invention in this regard is that a high-performance permanent magnet motor using a diametricallyl oriented cylindrical permanent magnet as the rotor can be obtained when the number of the magnetic poles of the multipolar-magnetized cylindrical permanent magnet or rotor, and the number of the stator teeth of the stator satisfy a certain specific relationship.

A secondary object of the invention is to provide a novel and improved diametrically oriented cylindrical permanent magnet or rotor having an increased height in its axial direction.

Thus, the permanent magnet motor provided by the invention to accomplish the above described primary object of the present invention is an assembly which comprises:
(a) a stator having a plurality of stator teeth; and
(b) a rotor coaxially inserted into the stator, which rotor is a monolithic cylindrical permanent magnet having magnetic anisotropy in a single diametrical direction perpendicular to the cylinder axis, and being magnetized to have a plurality of evenly disposed magnetic poles around the circumference of the cylinder. The number of the magnetic poles k of the rotor is an even integer not exceeding 100, and the number of the stator teeth n is equal to $3n_0$, with $n_0$ being a positive integer not exceeding 33, with the proviso that k is not equal to n.

In a particular embodiment of the above defined permanent magnet motor, the diametrically oriented cylindrical permanent magnet to be used as the rotor is provided with multipolar skew magnetization, in which the skew angle of the multipolar skewed magnetic poles is in the range from one tenth to two thirds of 360°/k.

In a further particular embodiment of the permanent magnet motor, the stator has a plurality of skewed stator teeth, in which the skew angle of the skewed stator teeth is in the range from one tenth to two thirds of 360°/k.

The above defined relationship between the number of the multipolar magnetic poles k of the rotor and the number of the stator teeth n of the stator can be defined in a different way such that the number of the magnetic poles k is an even number not smaller than 4, and the number of the stator teeth n is equal to $3k \cdot n_0/2$, with $n_0$ being a positive integer.

The present invention further provides, in order to accomplish the secondary object of the invention, a rotor in a permanent magnet motor in the form of a composite cylindrical permanent magnet block. The cylindrical permanent magnetic block comprises at least one assembly of at least two or preferably, two to ten cylindrical unit permanent magnets coaxially stacked one on the other, with each having magnetic anisotropy in a single diametrical direction perpendicular to the cylinder axis. The composite cylindrical permanent magnet block is provided with multipolar magnetization to provide a plurality of magnetic poles around the circumference of the cylindrical block.

In a particular embodiment of the above defined rotor for a permanent magnet motor, the direction of diametrical orientation of a first cylindrical unit permanent magnet makes a rotational displacement angle, within a plane perpendicular to the cylinder axis, relative to the direction of diametrical orientation of a second cylindrical unit permanent magnet that is adjacent to the first cylindrical unit permanent magnet. The angle is equal to 180° divided by the number of the cylindrical unit permanent magnets stacked together one on the other, assuming that the cylindrical unit permanent magnets each have an identical height with respect to one another.

In a further particular embodiment of the above defined rotor, the number of the magnetic poles around the circumference of the composite cylindrical permanent magnet block is an even number not exceeding 50, and the number of the cylindrical unit permanent magnets coaxially stacked together one on the other is equal to one half of the number of the magnetic poles.

In yet another particular embodiment of the above defined rotor, the composite cylindrical permanent magnet block is magnetized to have a plurality of skewed magnetic poles around its circumference, in which the skew angle of the skewed magnetic poles is in the range from one tenth to two thirds of 360° divided by the number of the skewed magnetic poles.

DETAILED DESCRIPTION OF THE PREFERRED EMBODIMENTS

In the following, the various embodiments of the present invention are described in detail by way of examples making reference to the accompanying drawings. Although the following description is given solely for the cases in which the cylindrical permanent magnet has magnetic anisotropy in a single diametric direction and is a neodymium/iron/boron-based permanent magnet, which belongs to a most promising class of rare earth-based permanent magnets, the scope of the present invention is never limited to such a specific class of magnets, and the principles of the present invention are applicable to any class of permanent magnets provided that the magnet is made from a magnetic alloy having crystalline magnetic anisotropy.

Figure 1A:
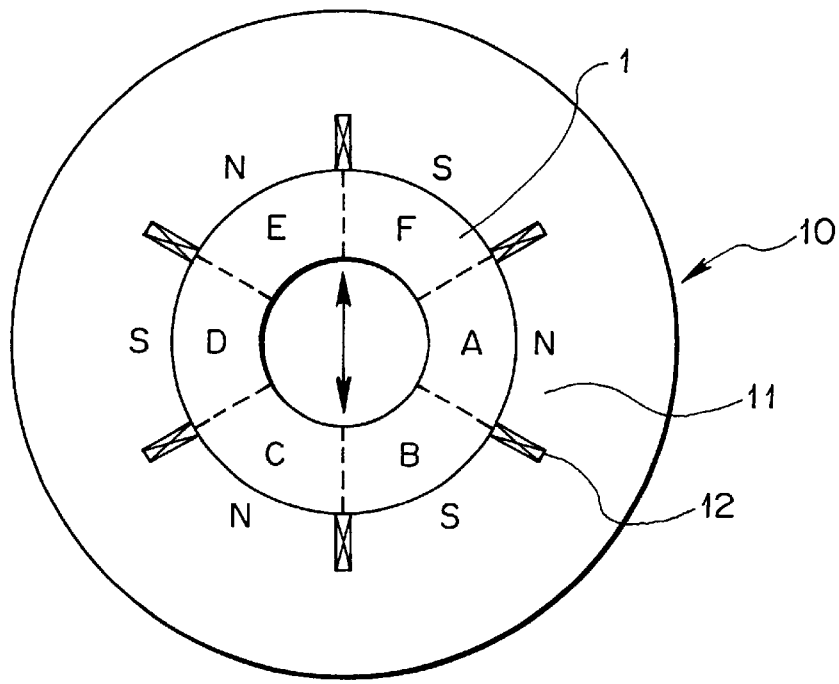
FIGS. 1A and 1B are each a schematic plan view of a diametrically oriented cylindrical permanent magnet, used as a rotor of a permanent magnet motor, subjected to six-polar magnetization in a magnetizer head, with the direction of diametrical orientation being parallel with or perpendicular to, respectively, the direction connecting a pair of energizing coils of the magnetizer head.

FIG. 1A of the accompanying drawings is a schematic plan view of a diametrically oriented cylindrical or ring-formed permanent magnet 1 subjected to six-polar magnetization in a magnetizer head 10. The direction of orientation of the diametrically oriented permanent magnet 1 is indicated by the double-sided arrow. The magnetizer head 10 has six magnetic pole teeth 11,11 and six energizing coils 12,12, by virtue of which the diametrically oriented cylindrical magnet 1 is six-polar magnetized to have three N-poles and three S-poles, such that the cylindrical magnet is an assembly of six imaginary sector magnets A, B, C, D, E and F.

Figure 2:
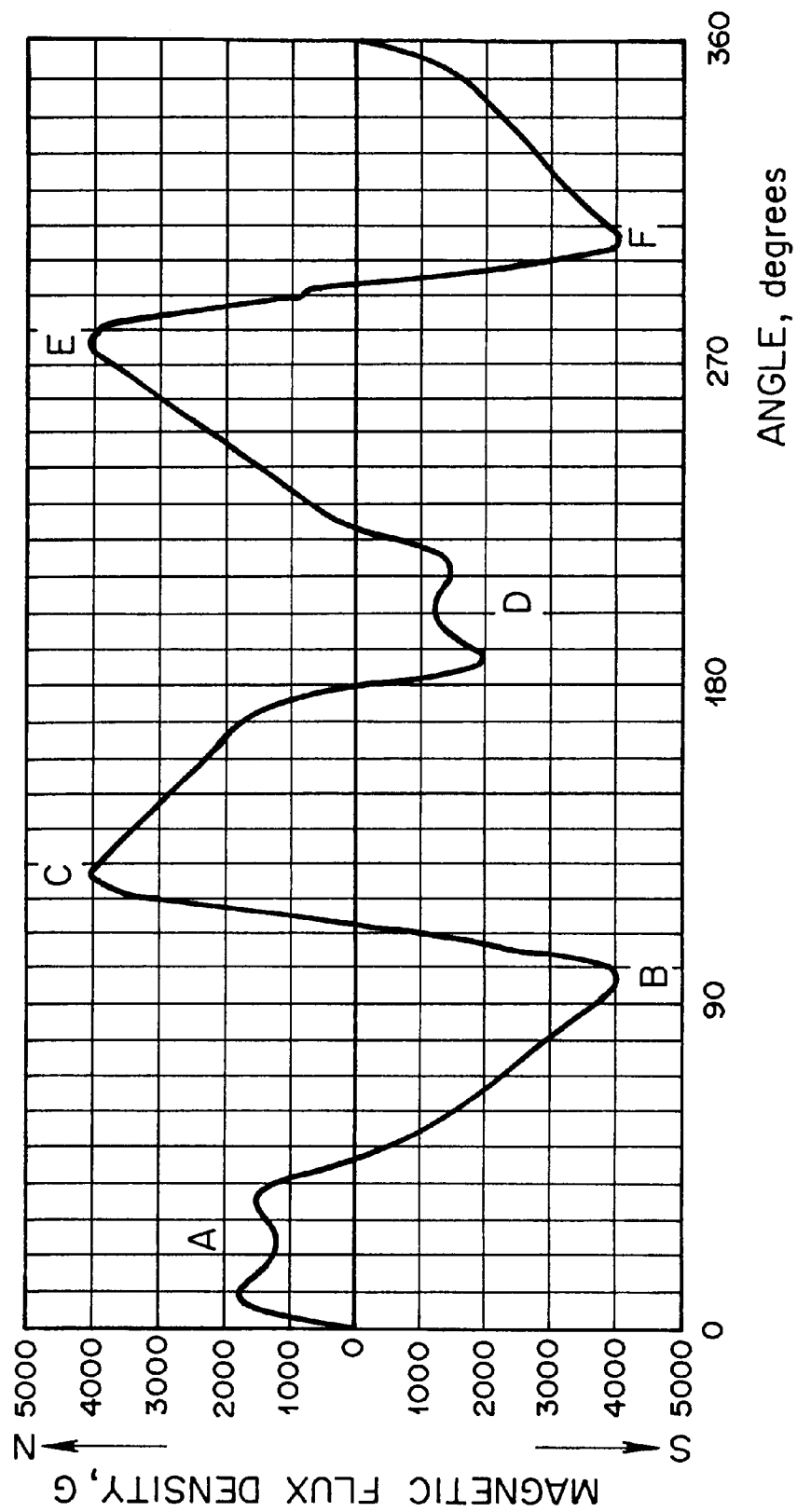
FIG. 2 is a graph showing distribution of the magnetic flux density on the circumferential surface of a diametrically oriented cylindrical permanent magnet provided with six-polar magnetization.

FIG. 2 is a graph showing distribution of the magnetic flux density on and around the circumferential surface of a diametrally oriented cylindrical permanent magnet 1 of a neodymium/iron/boron alloy that is magnetized by using the magnetizer head 10 illustrated in FIG. 1A to have six evenly disposed magnetic poles. This graph was-obtained by measuring the magnetic flux density on and around the circumferential surface of the cylindrical permanent magnet 1 starting from the imaginary sector A and going around the imaginary sectors B, C, D, E and F in this order.

As is shown in FIG. 2, the curve has maximum points corresponding to the respective imaginary sectors A to F, but the maximum values of magnetic flux density for the imaginary sectors B, C, E and F, adjacent to or in the vicinity of the direction of the diametrical orientation of the cylindrical magnet 1 is indicated by the double-sided arrow in FIG. 1A, are each much larger than the maximum values for the imaginary sectors A and D, which are remote from the direction of the diametrical orientation of the magnet 1. In addition, the peaks B, C, E and F of FIG. 2 each have a much larger breadth than the peaks A and D, notwithstanding the use of a magnetizer head having evenly disposed energizing coils 12,12, which provide an evenly distributed magnetizing field. Namely, the diametrically oriented cylindrical permanent magnet 1 magnetized with six-polar magnetization has six magnetic poles consisting of four poles B, C, E and F, each giving a large overall magnetic flux, and two poles A and D each giving a small overall magnetic flux. Needless to say, such unevenness in the distribution of magnetic flux density around the cylindrical permanent magnet 1, used as a rotor in a permanent magnet motor, results in unevenness of the rotation torque on the shaft of the motor, whereby smooth rotation of the motor shaft is not ensured.

Figure 3:
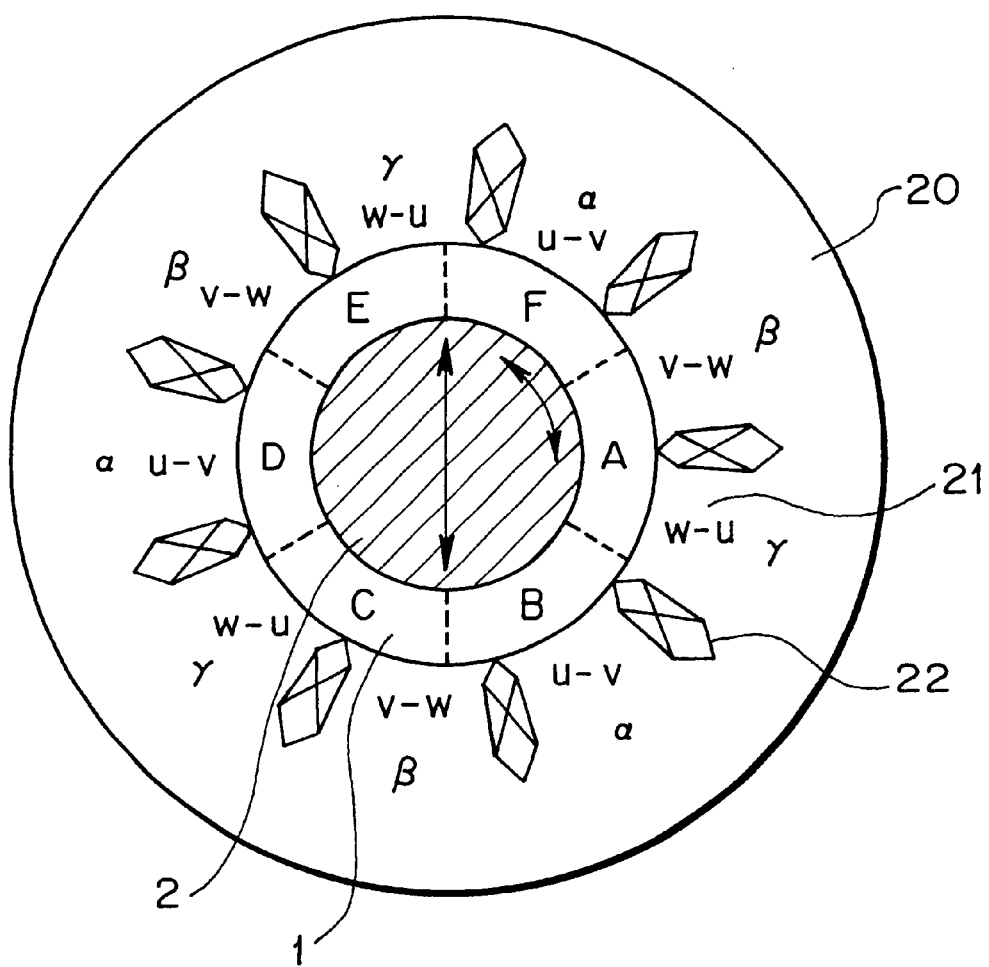
FIG. 3 is a schematic plan view of a three-phase permanent magnet motor built in accordance with Example 1, consisting of a rotor that is a six-polar magnetized diametrally oriented cylindrical permanent magnet and a stator with nine stator teeth.

FIG. 3 is a schematic plan view of a three-phase permanent magnet motor 20 having nine stator teeth 21,21 in three groups α, β and γ corresponding to the respective phases U, V and W of a three-phase power line, and arranged in this order clockwise around the rotor 1. The rotor is a diametrically oriented cylindrical permanent magnet having a direction of magnetic orientation indicated by the double-sided arrow, and magnetized to have six magnetic poles in the manner as illustrated in FIG. 1A. The wiring to the stator teeth is wound around the stator teeth 21,21, and connected together to respective phases of a power input line leading to the motor. When an electric current flows through the coils 22,22, a magnetic field is generated by the coils 22,22, so that the rotor 1 is rotated by virtue of the magnetic repulsion and attraction between the magnetic field generated by the coils 22,22 and the cylindrical permanent magnet 1. Each of U-V, V-W and W-U circumferentially covers one third of the overall stator teeth 21,21 and, when an electric current flows through U-V, a magnetic field is generated from α of the stator core. Similarly, a magnetic field is generated from β and from γ by virtue of an electric current flowing through V-W and W-U, respectively.

FIG. 3 depicts relative positions of the stator and the rotor such that U-V (α) is positioned to face the respective centers of the magnetic poles B, D and F of the cylindrical magnet 1, whereby a rotation torque is produced. The magnetic poles B and F are each in the vicinity of the direction of the diametrical orientation of the cylindrical magnet 1 as indicated by the double-sided arrow, so that the magnetic flux density is larger thereon than that on the magnetic pole D, which is remote from the direction of the diametrical orientation of the cylindrical magnet 1. Since the number of the stator teeth 21,21, i.e. nine, is 3/2 times of the number of the magnetic poles, i.e. six, in the rotor 1, the magnetic flux interlinking with the coils 22,22 of U-V (α) as the total contribution of the magnetic poles F, B and D is always equal to that of the magnetic poles E, A and C. This relationship is held also for V-W ((β) and U-V (γ). This situation means that, when a permanent magnet rotor having k magnetic poles, k being six in this case, is combined with a stator having n stator teeth ($n=3k \cdot n_0/2=9$, with $n_0$ being a positive integer and one in this case), a motor free from unevenness of rotation torque can be obtained. This is true even when the rotor is formed from a diametrically oriented cylindrical permanent magnet, of which the magnetic flux density on the surface is unavoidably uneven with a higher density in the vicinity of the direction of diametrical magnetic orientation than that in the direction perpendicular to the diametrical magnetic orientation, by virtue of mitigation of the unevenness of the magnetic flux density.

The above described advantage with regard to the evenness of rotation torque of a three-phase permanent magnet motor can be obtained for any combination using a cylindrical permanent magnet of k-polar magnetization as the rotor, and a stator, provided that the number of the stator teeth n is equal to $3k \cdot n_0/2$. Thus, permanent magnet motors exhibiting excellent performance without unevenness in rotation torque can be manufactured at low costs by using an inexpensive diametrically oriented cylindrical permanent magnet that is suitable for mass production by using a vertical-field in-field molding press.

A diametrically oriented cylindrical permanent magnet having multipolar magnetization has low magnetizability and magnetic properties in the vicinity of each magnetic pole as compared with a multi-radially anisotropic ring magnet. This ensures smooth variation in the magnetic flux density between magnetic poles, so that the cogging torque of the motor is small. The cogging torque can be further decreased when the cylindrical permanent magnet is skew-magnetized, or the stator has skewed stator teeth. The skew angle is preferably in the range from one tenth to two thirds of the angle spanned by a single magnetic pole of the cylindrical magnet, i.e. 360°/k. When the skew angle is too small, the cogging torque cannot be substantially decreased by the skew magnetization of the rotor or magnet and, when the skew angle is too large, an undue decrease is caused in the rotation torque of the motor.

In an alternative definition, the present invention provides a permanent magnet motor which comprises, as an assembly:
(a) a stator having a plurality of stator teeth; and
(b) a rotor coaxially inserted into the stator, which rotor is a monolithic cylindrical permanent magnet having magnetic anisotropy in a single diametrical direction perpendicular to the cylinder axis, and is magnetized to have a plurality of evenly disposed magnetic poles around the circumference of the cylinder. The number of the magnetic poles k of the rotor is an even number not exceeding 100, and the number of the stator teeth n is equal to $3n_0$, with $n_0$ being a positive integer not exceeding 33, with the proviso that k is not equal to n.

When a permanent magnet motor satisfies the above described requirements for the rotor and stator, a magnetic pole having a low magnetic flux density is combined in each of the phases with a magnetic pole having a high magnetic flux density, which results in a smooth distribution of the total magnetic flux, as an average, to ensure evenness in the rotation torque of the motor. Accordingly, high-performance synchronous permanent magnet motors with small torque ripples can be manufactured at low costs by using an inexpensive diametrically oriented cylindrical permanent magnet as the rotor.

It is also optional in this case that the diametrically oriented cylindrical permanent magnet used as the rotor can be provided with skew magnetization, and that the stator can have skewed stator teeth, with a skew angle in the range from one tenth to two thirds of 360°/k, i.e. 360° divided by the number of the magnetic poles.

In connection with the secondary object of the invention, the present invention provides a rotor in a permanent magnet motor in the form of a composite cylindrical permanent magnet block having an increased height, which comprises at least one assembly of at least two, or preferably, two to ten cylindrical unit permanent magnets coaxial stacked one on the other, with each having magnetic anisotropy in a single diametrical direction perpendicular to the cylinder axis. The composite cylindrical permanent magnet block is provided with multipolar magnetization to have a plurality of magnetic poles around the circumference of the cylindrical block.

In particular, the above defined composite cylindrical permanent magnet block having an increased height, and to be used as a rotor in a permanent magnet motor, is assembled in such a fashion that the direction of diametrical magnetic orientation of a first cylindrical unit permanent magnet makes a rotational displacement angle, within a plane perpendicular to the cylinder axis and relative to the direction of diametrical magnetic orientation of a second cylindrical unit permanent magnet that is adjacent to the first cylindrical unit permanent magnet of 180° divided by the number of the cylindrical unit permanent magnets stacked together one on the other, assuming that the cylindrical unit permanent magnets each have substantially the same axial dimension or height.

As is described above, the rotor in a permanent magnet motor provided by the invention to accomplish the secondary object of the invention is a composite cylindrical permanent magnet block, which consists of an assembly of at least two cylindrical unit permanent magnets each having a diametric orientation and coaxially stacked one on the other, and which is provided with multipolar magnetization.

In the plurality of cylindrical unit permanent magnets coaxial stacked one on the other to form a composite magnet block, the relationship between the direction of diametrical orientation and the direction of multipolar magnetization of one unit magnet can be different from that of the other unit magnets. Taking six-polar magnetization as an exemplary case, one of the unit magnets can be magnetized in such a fashion as is illustrated in FIG. 1A, in which the direction of the diametrical orientation in a unit magnet 1, indicated by the double-sided arrow, coincides with the direction connecting a pair of oppositely facing magnetizer coils 12,12 of the magnetizer head 10. The distribution of magnetic flux density on the surface of the unit magnet 1 having six-polar magnetization as illustrated in FIG. 1A is graphically shown in FIG. 2.

Figure 1B:
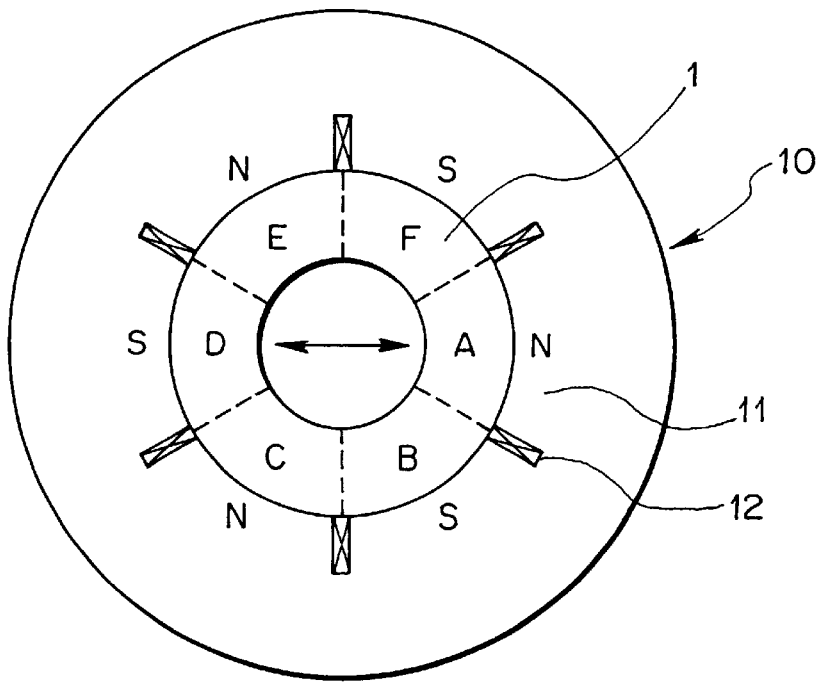

On the other hand, another unit magnet 1 can have six-polar magnetization in such a direction as illustrated in FIG. 1B, in which the direction of diametrical orientation of the magnet 1 is perpendicular to the direction connecting a pair of oppositely facing magnetizer coils 12,12 of the magnetizer head 10. In this case, the magnetic flux density is large on the magnetic poles A and D, at or in the vicinity of the direction of diametrical orientation of the magnet 1, while the magnetic flux density is small on the magnetic poles, B, C, E and F, that are remote from the direction of diametrical orientation of the magnet 1 as shown in FIG. 1B.

When a diametrally oriented cylindrical permanent magnet is divided by a plane perpendicular to the cylinder axis into two equal unit magnets, and they are coaxially stacked one on the other in such a disposition that the direction of diametral orientation in the second unit magnet makes a rotational displacement angle θ, varied up to 90° relative to the direction of diametral orientation of the first unit magnet, and the stack of the two unit magnets as a block is six-polar magnetized in such a disposition that the direction of the diametral orientation of the first unit magnet coincides with the direction connecting a pair of oppositely facing magnetizer coils as is illustrated in FIG. 1A, the overall magnetic flux on the magnetic poles A and D is increased while the overall magnetic flux on the magnetic poles B, C, E and F is decreased as the angle θ of rotation between the two unit magnets is increased.

The above description suggests a possibility of obtaining a permanent magnet motor having even torque rotation with decreased variation in the distribution of the magnetic flux density, by using a composite cylindrical permanent magnet block as the rotor. The composite cylindrical permanent magnet block comprises at least one assembly of two or more of cylindrical unit magnets obtained by dividing a diametrically oriented cylindrical permanent magnet block along the axial direction into a plurality of unit magnets to be coaxially stacked one on the other, followed by multipolar magnetization as a block.

Namely, two or more of the above mentioned divided unit magnets are coaxially stacked together one on the other each with a specified rotational displacement angle θ relative to the other unit magnets, so that the differences in the magnetic flux density between the direction of diametrical orientation and the direction perpendicular to the direction of diametrical orientation can be made uniform and the variation of the magnetic flux density can be decreased between the magnetic poles. When the number of the cylindrical unit permanent magnets is equal to p, assuming that the respective unit magnets have the same axial dimension or height, the rotational displacement angle θ of a unit magnet should be 180°/p in order to maximize the uniformizing effect on the distribution of the magnetic flux density.

Relative to the above mentioned requirement for the rotational displacement angle being equal to 180° divided by the number of the unit magnets stacked one on the other, it should be noted that the number p does not always mean the total number of the unit magnets. Namely, for example, a cylindrical magnet block consisting of six unit magnets can be a coaxial tandem combination of two cylindrical base magnet blocks each consisting of three unit magnets, with each cylindrical base magnet block consisting of three unit magnets and satisfying the requirement for the rotational displacement angle mentioned above.

In order to accomplish allotment of the directions of diametral orientation to the magnetic poles as uniformly as possible, it is preferable that the number of the stacked unit magnets is equal to one half of the number of magnetic poles formed by multipolar magnetization. When this requirement is satisfied, the portions of a relatively large magnetic flux in the directions of diametrical orientation and the portions of a relatively small magnetic flux in the directions perpendicular to the direction of diametrical orientation can be allotted uniformly to the respective magnetic poles and the overall magnetic fluxes on the respective magnetic poles after multipolar magnetization can be equalized provided that the rotational displacement angle θ of a unit magnet relative to the adjacent unit magnet is equal to 180° divided by the number of the unit magnets.

The number of magnetic poles k in the multipolar magnetization of the composite cylindrical permanent magnet block preferably should not exceed 50 because, when the number of the magnetic poles is too large, the span for each magnetic pole is necessarily so small that full magnetization of the composite magnet block can hardly be accomplished. Furthermore, the number of the cylindrical unit magnets p coaxially stacked together should not exceed 10 in consideration of the increase in the costs when the number of the unit magnets is too large.

It is of course optional in this composite cylindrical permanent magnet block consisting of a plurality of unit magnets that the multi-polar magnetization is performed for skew magnetization, and the permanent magnet motor, using the composite cylindrical permanent magnet block as the rotor, has a stator with skewed stator teeth to further decrease the inherently small cogging torque of the motor. The skew angle of the multipolar magnetization of the rotor magnet, and the skew angle of the skewed stator teeth each should be in the range from one tenth to two thirds of 360° divided by the number of the magnetic poles k.

In the following, the present invention is described in more detail by way of Examples and Comparative Examples making further reference to the accompanying drawings, which, however, never limit the scope of the invention in any way.

EXAMPLE 1

A rare earth-based magnetic alloy in the form of an ingot, which had a chemical composition expressed by the composition formula $Nd_{30.0}Dy_{3.0}Fe_{62.0}Co_{3.0}B_{1.0}Al_{0.4}Cu_{0.4}Si_{0.2}$, the numerical figures giving the percentages by weight of the respective elements, was prepared by melting together, in a vacuum melting furnace, a specified amount of a metallic or elementary form of neodymium, dysprosium, iron, cobalt, aluminum, silicon and copper each having a purity of 99.7% by weight, and elementary boron having a purity of 99.5% by weight, followed by casting the melt into a metal mold. The ingot obtained by cooling of the melt was first crushed in a jaw crusher, and then finely pulverized in a jet mill, using nitrogen gas as the jet gas, into a powder of particles having an average particle diameter of 3.5 μm.

This powder was compression-molded into a powder compact of a cylindrical form or ring under a molding pressure of 1.0 ton/cm², while applying a magnetic field of 12 kOe in the direction perpendicular to the direction of compression or, namely, perpendicular to the axis of the cylindrical form. The powder compact thus obtained was subjected to a sintering heat treatment in an atmosphere of argon gas at a temperature of 1090° C. for 1 hour, and then to an aging treatment at a temperature of 580° C. for 1 hour, followed by a machining operation to give a diametrically oriented sintered magnet body of a ring-form having an outer diameter of 30 mm, an inner diameter of 25 mm and a height of 30 mm.

Separately, a reference magnet in the form of a cylindrical block was prepared from the same magnetic alloy powder as used above and under the same conditions for molding and heat treatments as in the preparation of the above obtained ring-form magnet. This reference magnet had magnetic properties including Br of 13.0 kG, iHc of 15 kOe and (BH)max of 40 MGOe.

The diametrically oriented ring-form permanent magnet prepared above was subjected to six-polar magnetization by using a magnetizer head in the manner illustrated in FIG. 1A. A test three-phase permanent magnet motor was built, as is illustrated in FIG. 3 by a schematic plan view, by inserting the six-polar magnetized ring-form magnet 1, as the rotor, into a stator 20 having the same height as the rotor or magnet 1 and provided with nine stator teeth 21,21 and nine motor coils 22,22. A motor shaft 2 made of a ferromagnetic material was inserted into and fixed to the ring-form rotor 1. Each of the stator teeth 21 was formed with 100 turns of a fine copper wire.

The magnetic flux density between the respective phases U, V and W was measured by using a magnetic flux meter. The values of magnetic flux with six peaks during one revolution of the magnet 1 are shown in Table 1 below.

Comparative Example 1

The experimental procedure was substantially the same as in Example 1 described above except that the 100 turns of the fine copper wire was provided only in one of the nine stator teeth 21,21 of the stator 20. The values of the magnetic flux for the six peaks determined by the measurement with a flux meter are shown also in Table 1 below.

As is understood from the results shown in Table 1, the values of magnetic flux (absolute value) in Example 1 vary within a very narrow range of less than ±1%, while the largest value in Comparative Example 1 is about three times larger than the smallest value.

TABLE 1

| | Magnetic flux, kMx | | | | | |
|---|---|---|---|---|---|---|
| | peak 1 | peak 2 | peak 3 | peak 4 | peak 5 | peak 6 |
| Example 1 | | | | | | |
| U-V | −30.5 | 30.2 | −30.4 | 30.6 | −30.2 | 30.3 |
| V-W | −30.6 | 30.2 | −30.4 | 30.5 | −30.3 | 30.2 |
| W-U | 30.2 | −30.3 | 30.5 | −30.3 | 30.3 | −30.6 |
| Comparative Example 1 | 12.8 | −38.2 | 37.5 | −13.4 | 38.0 | −37.2 |

EXAMPLE 2

Measurements were made for the induced voltage when the rotor 1 of the test three-phase permanent magnet motor built in Example 1 was rotated at 1000 rpm, and measurements were also made for the torque ripples, by using a load cell when the rotor 1 was rotated at 1 to 5 rpm. The results were that the maximum value of the induced voltage was 50 volts, and the difference between the largest and smallest values of torque ripples was 0.077 Nm, indicating that this test motor was suitable for practical use due to the large induced voltage and small torque ripples.

EXAMPLE 3

A test three-phase permanent magnet motor was built in the same manner as in Example 1, except that the diametrically oriented cylindrical permanent magnet used as the rotor 1 was six-polar skew-magnetized at a skew angle of 20°, which is one third of the angle 60° spanned by a single magnetic pole. The maximum value of the induced voltage was 48 volts, which was comparable with the value of 50 volts of Example 2, and the difference between the largest and smallest values of torque ripples was 0.021 Nm, which was much smaller than the value of 0.077 Nm of Example 2.

Figure 4:
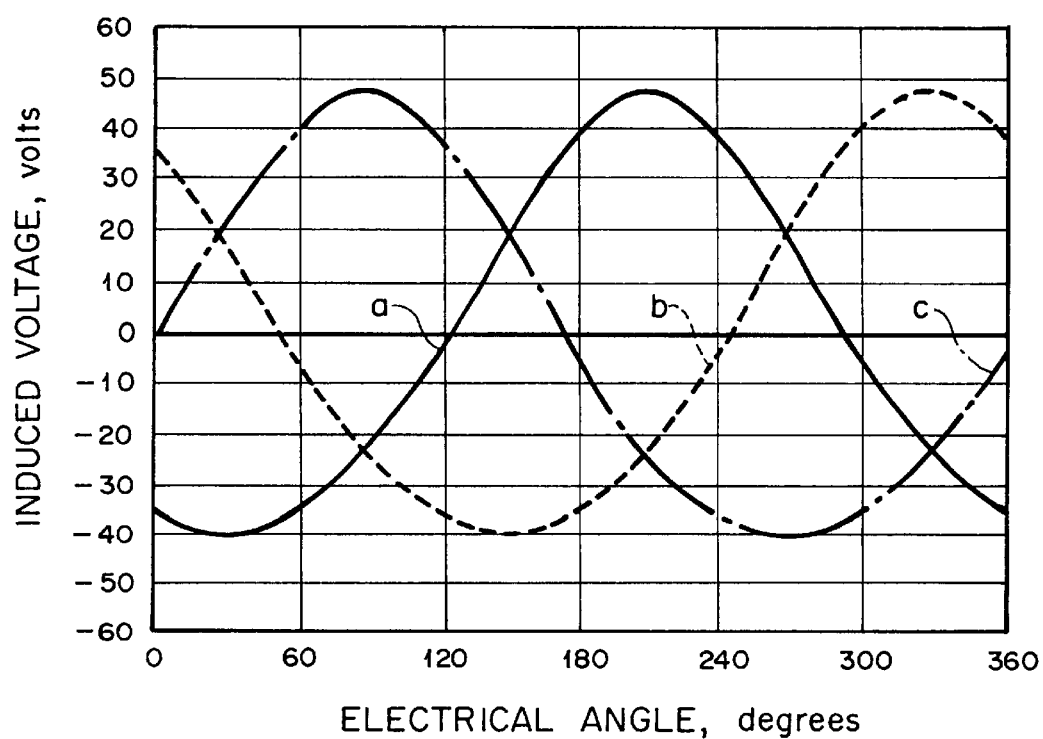
FIG. 4 is a graph showing the induced voltage in the three-phase permanent magnet motor built in accordance with Example 3, rotating at 1000 rpm, as a function of the electrical angle.

FIG. 4 of the accompanying drawings shows the induced voltage as a function of the electrical angle by the three curves a, b and c for the U-V, V-W and W-U phases, respectively, of FIG. 3. As is clear from FIG. 4, the induced voltage exhibits a smooth and regular sine curve without unevenness or irregularity.

EXAMPLE 4

A test three-phase permanent magnet motor was built in the same manner as in Example 1, except that the diametrically oriented cylindrical permanent magnet used as the rotor 1 was six-polar skew-magnetized at a skew angle of 50°, which is five sixths of the angle 60° spanned by a single magnetic pole. The maximum value of the induced voltage was 7 volts, but the difference between the largest and smallest values of torque ripples was 0.017 Nm, which was much smaller than the value in Example 2 by non-skewed multipolar magnetization.

EXAMPLE 5

A test three-phase permanent magnet motor was built in the same manner as in Example 1, except that the stator 20 had nine skewed stator teeth 21 at a skew angle of 20°, which is one third of the angle 60° spanned by a single magnetic pole of the six-polar magnetized diametrically oriented permanent magnet 1 used as the rotor. The maximum value of the induced voltage was 48 volts, which was comparable with the value of 50 volts in Example 2, and the difference between the largest and smallest values of torque ripples was 0.025 Nm, which was much smaller than the value of 0.077 Nm in Example 2 with non-skewed stator teeth.

EXAMPLE 6

Figure 5:
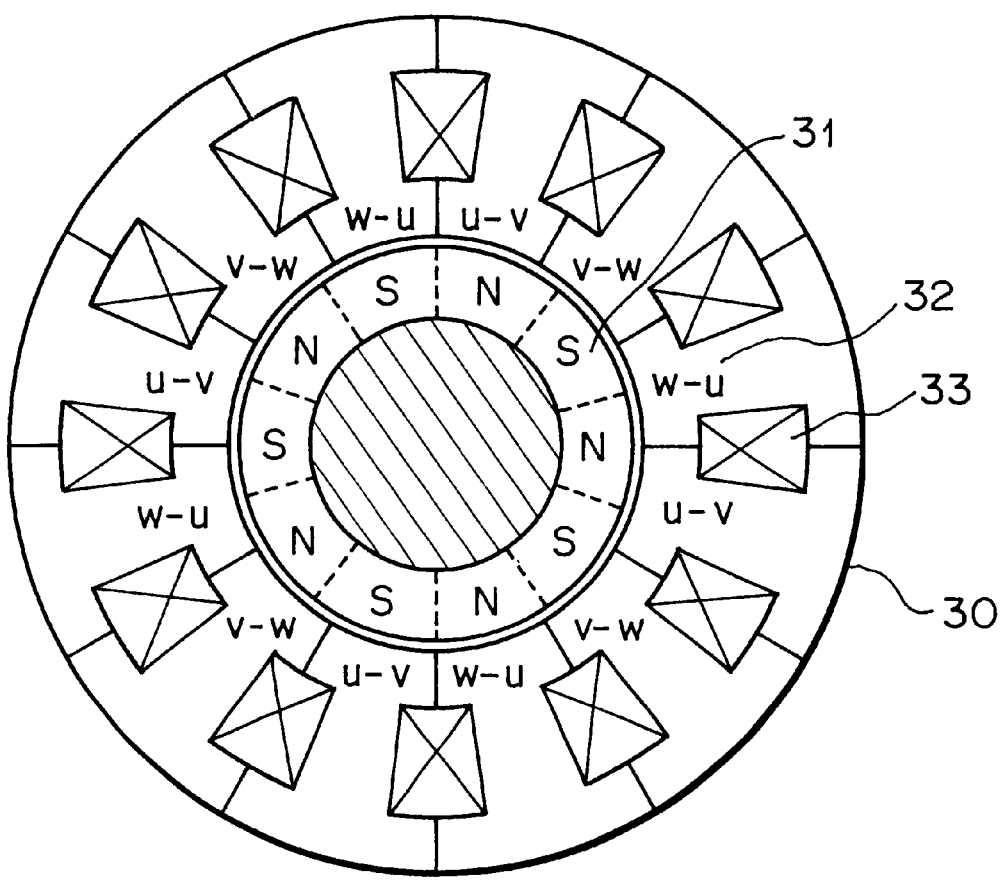
FIG. 5 is a schematic plan view of a three-phase permanent magnet motor built in accordance with Example 6, using a ten-polar magnetized diametrally oriented permanent magnet as the rotor, and a stator having twelve stator teeth.

A diametrically oriented cylindrical permanent magnet having the same dimensions as in Example 1 was prepared in just the same manner as in Example 1. This diametrically oriented cylindrical magnet 31 was magnetized in ten-polar magnetization and inserted, as is illustrated in FIG. 5 by a schematic plan view, in a stator 30 having twelve stator teeth 32 and twelve motor coils 33, each having 100 turns of copper wire to give a test three-phase permanent magnet motor.

Table 2 below shows the magnetic flux between the respective phases of U-V, V-W and W-U in this test motor determined by using a flux meter. As is understood from this table, the absolute values of the magnetic flux were in the range from 15.2 to 16.9 kMx with quite small variations, and the variation in the magnetic flux among magnetic poles could be fully eliminated by using the rotor in a motor.

Measurements were made for the induced voltage when the rotor 31 of the above test three-phase permanent magnet motor was rotated at 1000 rpm, and measurements were also made for the torque ripples, by using a load cell when the rotor 31 was rotated at 1 to 5 rpm. The results were that the maximum value of the induced voltage was 40 volts, and the difference between the largest and smallest values of torque ripples was 0.080 Nm, indicating that this test motor was suitable for practical use due to the large induced voltage and small torque ripples.

TABLE 2

| | Magnetic flux, kMx | | | | |
|---|---|---|---|---|---|
| | peak 1 | peak 2 | peak 3 | peak 4 | peak 5 |
| U-V | 16.5 | −15.8 | 16.2 | −16.6 | 15.7 |
| V-W | 15.6 | −15.2 | 16.4 | −16.5 | 15.3 |
| W-U | 16.2 | −16.8 | 16.3 | −15.3 | 16.3 |
| | peak 6 | peak 7 | peak 8 | peak 9 | peak 10 |
| U-V | −16.3 | 15.5 | −15.4 | 16.3 | −15.8 |
| V-W | −15.4 | 16.4 | −16.2 | 15.8 | −16.7 |
| W-U | −15.8 | 16.2 | −16.2 | 16.0 | −15.9 |

EXAMPLE 7

A test three-phase permanent magnet motor was built in the same manner as in Example 6, except that the diametrally oriented cylindrical permanent magnet used as the rotor 31 was ten-polar skew-magnetized at a skew angle of 12°, which is one third of the angle 36° spanned by a single magnetic pole. The maximum value of the induced voltage was 38 volts, which was about the same as the corresponding value in Example 6, and the difference between the largest and smallest values of torque ripples was 0.021 Nm, which was much smaller than the value of 0.080 Nm in Example 6 with non-skewed magnetic poles.

EXAMPLE 8

A test three-phase permanent magnet motor was built in the same manner as in Example 6, except that the stator 30 had twelve skewed stator teeth 32 at a skew angle of 12°, which is one third of the angle 36° spanned by a single magnetic pole of the ten-polar magnetized diametrically oriented permanent magnet 31 used as the rotor. The maximum value of the induced voltage was 38 volts, which was only slightly smaller than the value of 40 volts in Example 6, and the difference between the largest and smallest values of torque ripples was 0.025 Nm, which was much smaller than the value of 0.080 Nm in Example 6 with non-skewed stator teeth.

EXAMPLE 9

A test three-phase permanent magnet motor was built in the same manner as in Example 6, except that the diametrically oriented cylindrical permanent magnet used as the rotor 31 was ten-polar skew-magnetized at a skew angle of 30°, which is five sixths of the angle 36° spanned by a single magnetic pole. The maximum value of the induced voltage was 7 volts, but the difference between the largest and smallest values of torque ripples was 0.017 Nm, which was much smaller than the value 0.080 Nm in Example 6 with non-skew multipolar magnetization.

Comparative Example 2

Two diametrically oriented cylindrical permanent magnets each having an outer diameter of 30 mm, inner diameter of 25 mm and height of 15 mm were prepared from the same rare earth magnetic alloy powder as used in Example 1, and from performing the same preparation procedures as in Example 1. These two diametrically oriented cylindrical unit magnets were coaxially stacked one on the other in such a disposition that the directions of the diametrical orientation of the two unit magnets made a rotational displacement angle of 60° within a plane that is perpendicular to the cylinder axis, and the stack was subjected to six-polar magnetization as a block on a magnetizer head in such a manner that one of the unit magnets was positioned relative to the magnetizer head as illustrated in FIG. 1A.

The magnetic flux around this six-polar magnetized composite cylindrical magnet block as a stack of the two unit magnets was measured in the manner described below. Thus, a 10.5 mm by 30 mm rectangular coil with 50 turns of a fine copper wire was prepared, and the coil was quickly moved from a position in direct contact with one of the magnetic poles of the composite magnet block to a sufficiently remote position out of substantial reach of the magnetic field around the composite magnet block, in order to determine the magnetic flux by using a flux meter. The six peak values of the magnetic flux are shown in Table 3 below for the respective magnetic poles.

EXAMPLE 10

The experimental procedure was just the same as in Comparative Example 2, except that the two diametrically oriented cylindrical unit magnets were coaxially stacked one on the other to give a composite magnet block in such a disposition that the directions of the diametrical orientation of the two unit magnets made a rotational displacement angle of 90° therebetween, instead of 60° as in Comparative Example 2.

The results of the magnetic flux measurement are shown also in Table 3.

Comparative Example 3

The experimental procedure was just the same as in Comparative Example 2, except that the two diametrically oriented cylindrical unit magnets were coaxially stacked one on the other in such a disposition that the directions of the diametrical orientation of the two unit magnets were along the same direction making no rotational displacement angle therebetween, instead of 60° in Comparative Example 2.

The results of the magnetic flux measurement are shown also in Table 3.

EXAMPLE 11

The experimental procedure was about the same as in Comparative Example 2, except that each of the three diametrically oriented cylindrical unit permanent magnets had dimensions of an outer diameter of 30 mm, inner diameter of 25 mm and height of 10 mm instead of 15 mm in Comparative Example 2 and three, instead of two, unit magnets were coaxially stacked one on the other in such a disposition that the directions of the diametrical orientation of the first and second unit magnets made a rotational displacement angle of 60° therebetween, and the direction of diametrical orientation of the third unit magnet made a rotational displacement angle of 60° with respect to the second unit magnet and a rotational displacement angle of 120° with respect to the first unit magnet therebetween.

Figure 6:
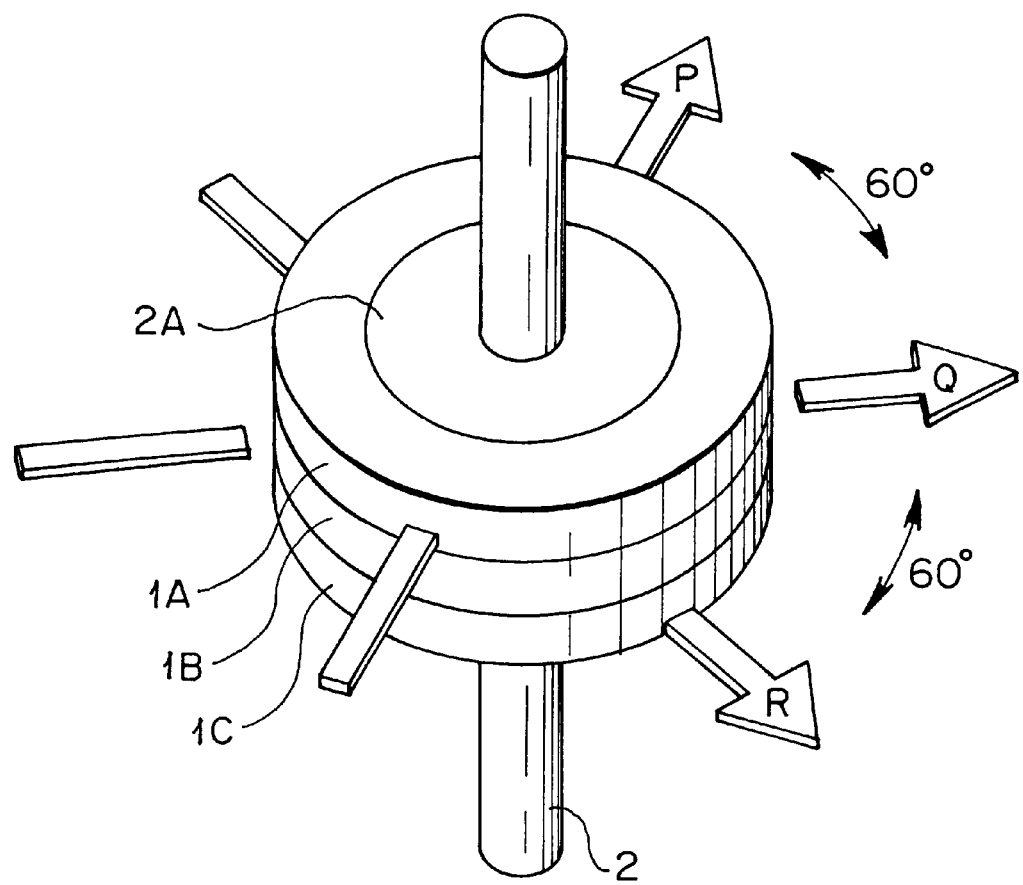
FIG. 6 is a perspective view of a multi-stage composite rotor consisting of three diametrically oriented cylindrical unit permanent magnets coaxially stacked together one on the other, in such a disposition that the direction of diametrical orientation of one unit magnet makes an angle of 60° with respect to that of an adjacent unit magnet.

FIG. 6 of the accompanying drawings is a perspective view of the thus constructed three-stage composite cylindrical permanent magnet block consisting of three diametrically oriented cylindrical unit magnets 1A, 1B and 1C coaxially stacked one on the other. A motor shaft 2 and motor core 2A are inserted into the center openings of the cylindrical unit magnets 1A, 1B and 1C. The bold arrows P, Q and R depicted as if to penetrate one of the unit magnets 1A, 1B and 1C, respectively, indicate the direction of diametrical orientation of the respective unit magnets 1A, 1B and 1C.

The results of the magnetic flux measurement are shown also in Table 3 below.

TABLE 3

| | Magnetic flux, kMx | | | | | |
|---|---|---|---|---|---|---|
| | peak 1 | peak 2 | peak 3 | peak 4 | peak 5 | peak 6 |
| Example 10 | 10.10 | −8.72 | 10.02 | −10.04 | 8.86 | −10.20 |
| Example 11 | 10.56 | −10.62 | 10.52 | −10.54 | 10.60 | −10.56 |
| Comparative Example 2 | 8.22 | −8.10 | 11.99 | −8.20 | 8.16 | −12.12 |
| Comparative Example 3 | 3.82 | −12.26 | 12.44 | −4.02 | 12.08 | −11.90 |

EXAMPLE 12

A test three-phase permanent magnet motor was built in the same manner as in Example 3, except that the two-stage composite cylindrical permanent magnet block prepared in Example 10 was used as the rotor in place of the monolithick permanent magnet in Example 3, and that the number of turns of copper wire in each of the stator teeth was 150 turns instead of 100 turns as in Example 3. The stator had skewed stator teeth at a skew angle of 20°, which is one third of the angle 60° spanned by a single magnetic pole.

Measurements were made for the induced voltage and the torque ripples in the same manner as in Example 2. The results were that the maximum value of the induced voltage was 78 volts and the maximum value of torque ripples was 0.028 Nm, indicating that this test motor was suitable for practical use due to the large induced voltage and small torque ripples.

EXAMPLE 13

The experimental procedure was substantially the same as in Example 12, except that the three-stage composite cylindrical permanent magnet block prepared in Example 11 was used as the rotor instead of the two-stage composite magnet block used in Example 12.

The results of the measurements were that the induced voltage was 85 volts and the maximum value of torque ripples was 0.021 Nm, indicating a still higher performance of the motor than that of Example 12.

Figure 7:
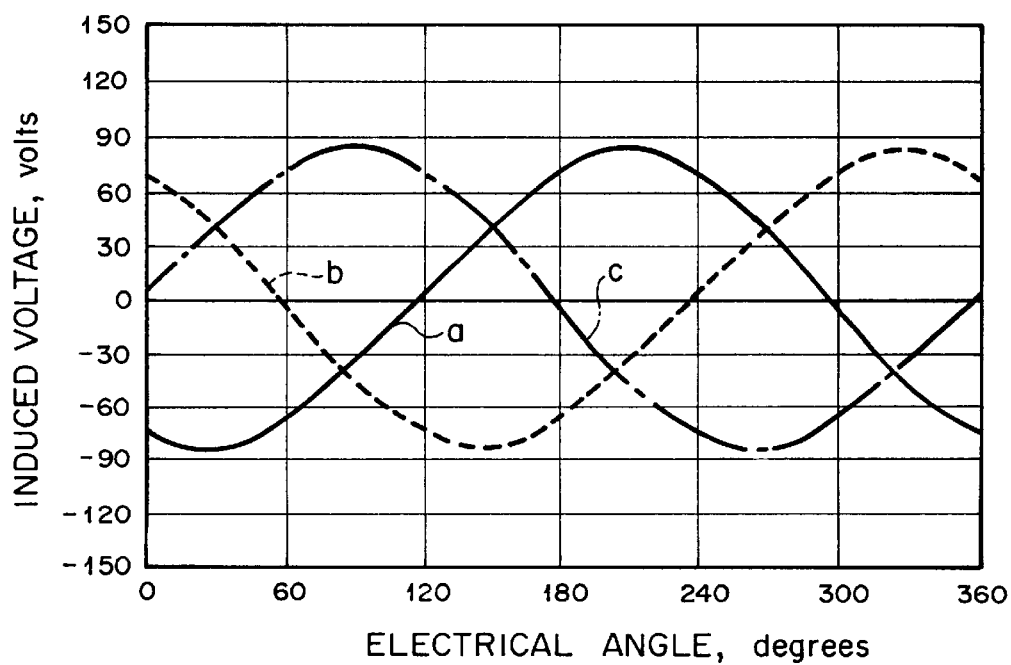
FIG. 7 is a graph showing the induced voltage in the three-phase permanent magnet motor built in accordance with Example 13, rotating at 1000 rpm, as a function of the electrical angle.

FIG. 7 is a graph showing the induced voltage in the three-phase permanent magnet motor built above, while rotating at 1000 rpm, as a function of the electrical angle. The curves a, b and c show the induced voltage in the phases U-V, V-W and W-U, respectively. Each of these curves exhibits a regular sine curve indicating smoothness of rotation of the motor.

Comparative Example 4

The experimental procedure was substantially the same as in Example 12, except that the two-stage composite cylindrical permanent magnet block used in Example 12 was replaced with a monolithic diametrically oriented cylindrical permanent magnet to be used as the rotor.

The results of the measurements were that the induced voltage was 73 volts and the maximum value of torque ripples was 0.120 Nm, indicating that this test motor was not suitable for practical use due to the unduly large torque ripples.

Comparative Example 5

The experimental procedure was substantially the same as in Example 12, except that the skew angle of the six-polar skew-magnetized composite cylindrical permanent magnet block was 50°, which is five sixths of the angle 60° spanned by a single magnetic pole, instead of 20° in Example 12.

The results of the measurements were that the induced voltage was only 13 volts and the maximum value of torque ripples was 0.015 Nm, indicating that this test motor was not suitable for practical use due to the unduly small induced voltage.

EXAMPLE 14

Figure 8:
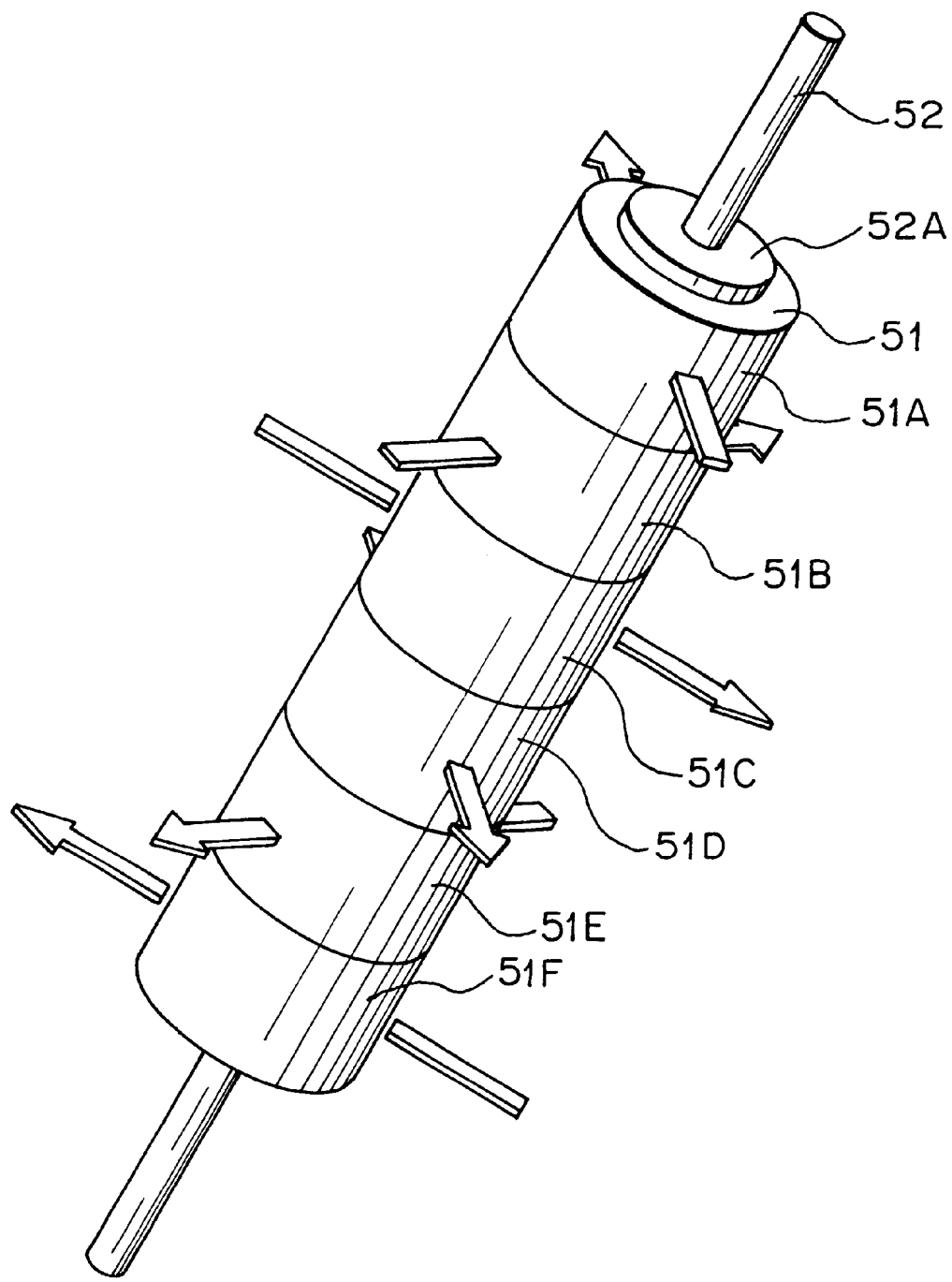
FIG. 8 is a perspective view of a multi-stage composite rotor consisting of six diametrically oriented cylindrical unit permanent magnets coaxially stacked together one on the other, in such a disposition that the direction of diametrical orientation of one unit magnet makes an angle of 120° with respect to that of an adjacent unit magnet.

Six diametrically oriented cylindrical unit permanent magnets 51A, 51B, 51C, 51D, 51E, 51F each having dimensions of an outer diameter of 25 mm, inner diameter of 20 mm and height of 15 mm were prepared from the same rare earth-based permanent magnet alloy powder prepared and used in Example 1 under the same preparation conditions as in Example 1. These unit magnets 51A to 51F were coaxially stacked one on the other to form a six-stage composite cylindrical magnet block 51 in such a disposition relative to the direction of the diametrical orientation of the respective unit magnets, as is illustrated in FIG. 8, which is a perspective view of a rotor consisting of the composite cylindrical magnet block 51 with insertion of the motor shaft 52 and motor core 52A, that the direction of diametrical orientation in a unit magnet made a rotational displacement angle of 60° with the direction of diametrical orientation of the adjacent unit magnet as is indicated by the bold arrow marks in FIG. 8 as if to penetrate the respective unit magnets 51A to 51F.

It is noted that the above described six-stage composite cylindrical magnet block 51, in which the rotational displacement angle between adjacent unit magnets is 60° as is mentioned above, is equivalent to a tandem combination of two three-stage magnet blocks in each of which the rotational displacement angle between adjacent unit magnets is 120°, which is one third of 360°.

The six-stage composite cylindrical permanent magnet block 51 prepared above was subjected to six-polar skew magnetization with a skew angle of 7°. A three-phase permanent magnet motor was built with the rotor consisting of the composite cylindrical magnet block 51 with insertion of the motor shaft 52 and motor core 52A and a stator having nine stator teeth.

The results of the measurements were that the induced voltage was 45 volts and the maximum value of torque ripples was 0.013 Nm indicating that this test motor was suitable for practical use.

Comparative Example 6

The experimental procedure was substantially the same as in Example 14 except that the six cylindrical unit magnets were coaxially stacked one on the other in such a disposition that the directions of diametrical orientation in the unit magnets were in one and the same direction, making no rotational displacement angle between the directions of two adjacent unit magnets.

The results of the measurements were that the induced voltage was 40 volts but the maximum value of torque ripples was as large as 0.569 Nm, indicating that this test motor was not suitable for practical use due to the unduly large torque ripples as compared with that in Example 13.

What is claimed is:

1. A permanent magnet motor comprising:

a stator having stator teeth; and a rotor coaxially inserted within said stator, wherein said rotor comprises a cylindrical permanent magnet having magnetically anisotropic orientation in a single diametrical direction perpendicular to a cylinder axis of said cylindrical permanent magnet, and with said permanent magnet being multipolar skew-magnetized to have evenly disposed skewed magnetic poles around a circumference of said cylindrical permanent magnet, wherein said evenly disposed skewed magnetic poles are k in number, and wherein a skew angle of said evenly disposed skewed magnetic poles is within a range of from 1/10 of 360°/k to 2/3 of 360°/k.

2. The permanent magnet according to claim 1, wherein k is an even integer not smaller than 4 and said stator teeth are n in number, with n being equal to $3kn_0/2$ when $n_0$ is a positive integer.

3. The permanent magnet according to claim 1, wherein k is an even integer not exceeding 100 and said stator teeth are n in number, with n being equal to $3n_0$ when $n_0$ is a positive integer not exceeding 33, with the proviso that k is not equal to n.

4. A permanent magnet motor comprising:

a stator having skewed stator teeth; and a rotor coaxially inserted within said stator, wherein said rotor comprises a cylindrical permanent magnet having magnetically anisotropic orientation in a single diametrical direction perpendicular to a cylinder axis of said cylindrical permanent magnet, with said permanent magnet being magnetized to have evenly disposed magnetic poles around a circumference of said cylindrical permanent magnet, wherein said evenly disposed magnetic poles are k in number, and wherein a skew angle of said skewed stator teeth is within a range of from 1/10 of 360°/k to 2/3 of 360°/k.

5. The permanent magnet according to claim 4, wherein k is an even integer not smaller than 4 and said stator teeth are n in number, with n being equal to $3kn_0/2$ when $n_0$ is a positive integer.

6. The permanent magnet according to claim 4, wherein k is an even integer not exceeding 100 and said stator teeth are n in number, with n being equal to $3n_0$ when $n_0$ is a positive integer not exceeding 33, with the proviso that k is not equal to n.

* * * * *